United States Patent
Liu et al.

(10) Patent No.: US 9,104,265 B2
(45) Date of Patent: Aug. 11, 2015

(54) TOUCH DEVICE AND OPERATING METHOD THEREOF

(75) Inventors: Jui-Ming Liu, Tainan (TW); Li-Lin Liu, Tainan (TW); Chung-Wen Chang, Tainan (TW); Shen-Feng Tai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 211 days.

(21) Appl. No.: 13/492,463

(22) Filed: Jun. 8, 2012

(65) Prior Publication Data

US 2013/0328823 A1 Dec. 12, 2013

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01)

(58) Field of Classification Search
CPC ........ G06F 3/041; G06F 3/044; G06F 3/0418
USPC .......................................... 345/174, 173, 178
See application file for complete search history.

(56) References Cited

U.S. PATENT DOCUMENTS

| | | | |
|---|---|---|---|
| 8,054,296 B2* | 11/2011 | Land et al. | 345/173 |
| 8,773,146 B1* | 7/2014 | Hills et al. | 324/658 |
| 2008/0158182 A1* | 7/2008 | Westerman | 345/173 |
| 2009/0174676 A1* | 7/2009 | Westerman | 345/173 |
| 2012/0026086 A1* | 2/2012 | Liang et al. | 345/157 |
| 2012/0044150 A1* | 2/2012 | Karpin et al. | 345/173 |
| 2012/0105371 A1* | 5/2012 | Hotelling et al. | 345/174 |

FOREIGN PATENT DOCUMENTS

| | | |
|---|---|---|
| CN | 101995984 | 3/2011 |
| CN | 102043549 | 5/2011 |

OTHER PUBLICATIONS

"Office Action of Taiwan Counterpart Application", issued on Sep. 5, 2014, p. 1-p. 7.

* cited by examiner

*Primary Examiner* — Dwayne Bost
*Assistant Examiner* — Chineyere Wills-Burns
(74) *Attorney, Agent, or Firm* — J.C. Patents (57) ABSTRACT

A touch device and an operating method thereof are provided. The operating method includes the following steps. A plurality of data baseline values of the touch panel is calibrated and set during an initialization of a touch panel. A plurality of touch data is obtained after scanning the touch panel. A plurality of touch values corresponding to the touch panel is calculated according to the data baseline values and the touch data. A touch point is detected according to the touch values. When the touch data is complied with a re-calibration requirement, the data baseline values are re-calibrated and reset.

16 Claims, 7 Drawing Sheets

FIG. 1

| | 111_1 | 111_2 | 111_3 | 111_4 | 111_5 | 111_6 | 111_7 | 111_8 | 111_9 | 111_10 | 111_11 | 111_12 | 111_13 | 111_14 | 111_15 |
|---|---|---|---|---|---|---|---|---|---|---|---|---|---|---|---|
| DB_S | 174 | 145 | 172 | 93 | 98 | 91 | 152 | 117 | 169 | 132 | 150 | 158 | 99 | 96 | 138 |
| DTT_1 | 178 | 153 | 173 | 94 | 107 | 94 | 139 | 92 | 151 | 122 | 159 | 165 | 103 | 102 | 141 |
| VP_1 | 4 | 8 | 1 | 1 | 9 | 3 | -13 | -25 | -18 | -10 | 9 | 7 | 4 | 6 | 3 |

| | 113_1 | 113_2 | 113_3 | 113_4 | 113_5 | 113_6 | 113_7 | 113_8 | 113_9 |
|---|---|---|---|---|---|---|---|---|---|
| DB_S | 126 | 99 | 113 | 111 | 114 | 123 | 125 | 167 | 90 |
| DTT_1 | 112 | 77 | 105 | 115 | 122 | 124 | 133 | 169 | 92 |
| VP_1 | -14 | -22 | -8 | 4 | 8 | 1 | 8 | 2 | 2 |

FIG. 2

|      | 111_1 | 111_2 | 111_3 | 111_4 | 111_5 | 111_6 | 111_7 | 111_8 | 111_9 | 111_10 | 111_11 | 111_12 | 111_13 | 111_14 | 111_15 |
|------|-------|-------|-------|-------|-------|-------|-------|-------|-------|--------|--------|--------|--------|--------|--------|
| DB_S | 174 | 145 | 172 | 93 | 98 | 91 | 152 | 117 | 169 | 132 | 150 | 158 | 99 | 96 | 138 |
| DTT_2 | 179 | 150 | 174 | 99 | 99 | 91 | 153 | 125 | 171 | 139 | 152 | 167 | 102 | 103 | 142 |
| VP_2 | 5 | 5 | 2 | 6 | 1 | 0 | 1 | 8 | 2 | 7 | 2 | 9 | 3 | 7 | 4 |
| DTT_3 | 193 | 166 | 178 | 111 | 110 | 96 | 160 | 132 | 183 | 155 | 165 | 183 | 110 | 113 | 154 |
| VP_3 | 19 | 21 | 6 | 18 | 12 | 5 | 8 | 15 | 14 | 23 | 15 | 25 | 11 | 17 | 16 |

|      | 113_1 | 113_2 | 113_3 | 113_4 | 113_5 | 113_6 | 113_7 | 113_8 | 113_9 |
|------|-------|-------|-------|-------|-------|-------|-------|-------|-------|
| DB_S | 126 | 99 | 113 | 111 | 114 | 123 | 125 | 167 | 90 |
| DTT_2 | 131 | 107 | 119 | 115 | 119 | 126 | 130 | 170 | 98 |
| VP_2 | 5 | 8 | 6 | 4 | 5 | 3 | 5 | 3 | 8 |
| DTT_3 | 143 | 112 | 121 | 131 | 123 | 134 | 150 | 172 | 102 |
| VP_3 | 17 | 13 | 8 | 20 | 9 | 11 | 25 | 5 | 12 |

FIG. 3

|      | 111_1 | 111_2 | 111_3 | 111_4 | 111_5 | 111_6 | 111_7 | 111_8 | 111_9 | 111_10 | 111_11 | 111_12 | 111_13 | 111_14 | 111_15 |
|------|-------|-------|-------|-------|-------|-------|-------|-------|-------|--------|--------|--------|--------|--------|--------|
| DB_S | 174 | 145 | 172 | 93 | 98 | 91 | 152 | 117 | 169 | 132 | 150 | 158 | 99 | 96 | 138 |
| DTT_2 | 179 | 150 | 174 | 99 | 99 | 91 | 153 | 125 | 171 | 139 | 152 | 167 | 102 | 103 | 142 |
| VP_2 | 5 | 5 | 2 | 6 | 1 | 0 | 1 | 8 | 2 | 7 | 2 | 9 | 3 | 7 | 4 |
| DTT_4 | 171 | 141 | 170 | 90 | 89 | 81 | 134 | 120 | 157 | 126 | 134 | 159 | 75 | 76 | 134 |
| VP_4 | -3 | -4 | -2 | -3 | -9 | -10 | -18 | 3 | -12 | -6 | -16 | 1 | -24 | -20 | -4 |

|      | 113_1 | 113_2 | 113_3 | 113_4 | 113_5 | 113_6 | 113_7 | 113_8 | 113_9 |
|------|-------|-------|-------|-------|-------|-------|-------|-------|-------|
| DB_S | 126 | 99 | 113 | 111 | 114 | 123 | 125 | 167 | 90 |
| DTT_2 | 131 | 107 | 119 | 115 | 119 | 126 | 130 | 170 | 98 |
| VP_2 | 5 | 8 | 6 | 4 | 5 | 3 | 6 | 3 | 8 |
| DTT_4 | 113 | 101 | 110 | 108 | 91 | 106 | 104 | 164 | 70 |
| VP_4 | -13 | 2 | -3 | -3 | -23 | -17 | -21 | -3 | -20 |

FIG. 4

| 120 | 130 | 127 | 121 | 121 | 126 | 128 | 139 | 130 | 125 | 120 | 138 | 137 | 120 | 138 |
|---|---|---|---|---|---|---|---|---|---|---|---|---|---|---|
| 124 | 126 | 135 | 130 | 130 | 131 | 137 | 133 | 121 | 135 | 132 | 133 | 124 | 138 | 134 |
| 128 | 133 | 131 | 131 | 120 | 137 | 130 | 125 | 135 | 133 | 121 | 122 | 129 | 133 | 135 |
| 124 | 134 | 128 | 125 | 135 | 139 | 124 | 136 | 131 | 122 | 133 | 120 | 133 | 132 | 124 |
| 124 | 127 | 129 | 132 | 129 | 124 | 137 | 134 | 130 | 128 | 121 | 135 | 127 | 130 | 131 |
| 120 | 120 | 121 | 132 | 125 | 136 | 128 | 134 | 135 | 122 | 130 | 138 | 129 | 137 | 137 |
| 136 | 139 | 128 | 123 | 137 | 126 | 135 | 135 | 133 | 126 | 136 | 126 | 127 | 127 | 120 |
| 139 | 137 | 134 | 131 | 129 | 126 | 137 | 121 | 126 | 125 | 121 | 129 | 129 | 130 | 125 |
| 132 | 134 | 122 | 125 | 138 | 129 | 134 | 131 | 132 | 122 | 135 | 130 | 136 | 129 | 136 |

FIG. 5

| 115 | 127 | 118 | 119 | 111 | 123 | 126 | 129 | 126 | 119 | 116 | 133 | 128 | 119 | 128 |
|---|---|---|---|---|---|---|---|---|---|---|---|---|---|---|
| 119 | 119 | 128 | 127 | 124 | 126 | 133 | 128 | 118 | 131 | 122 | 125 | 120 | 134 | 130 |
| 122 | 126 | 125 | 129 | 110 | 130 | 124 | 121 | 130 | 123 | 114 | 112 | 128 | 123 | 129 |
| 114 | 132 | 131 | 116 | 132 | 132 | 116 | 128 | 126 | 116 | 132 | 114 | 132 | 127 | 115 |
| 122 | 131 | 140 | 141 | 119 | 123 | 129 | 127 | 126 | 127 | 113 | 125 | 122 | 125 | 122 |
| 113 | 130 | 143 | 144 | 119 | 128 | 120 | 126 | 127 | 119 | 120 | 130 | 126 | 129 | 130 |
| 134 | 142 | 137 | 131 | 132 | 124 | 125 | 131 | 131 | 118 | 132 | 118 | 126 | 120 | 114 |
| 130 | 131 | 130 | 126 | 119 | 117 | 136 | 120 | 122 | 121 | 120 | 126 | 125 | 122 | 121 |
| 126 | 124 | 114 | 118 | 132 | 123 | 132 | 127 | 125 | 120 | 130 | 124 | 135 | 121 | 134 |

| 5 | 3 | 9 | 2 | 10 | 3 | 2 | 10 | 4 | 6 | 4 | 5 | 9 | 1 | 10 |
|---|---|---|---|---|---|---|---|---|---|---|---|---|---|---|
| 5 | 7 | 7 | 3 | 6 | 5 | 4 | 5 | 3 | 4 | 10 | 8 | 4 | 4 | 4 |
| 6 | 7 | 6 | 2 | 10 | 7 | 6 | 4 | 5 | 10 | 7 | 10 | 1 | 10 | 6 |
| 10 | 2 | -3 | 9 | 3 | 7 | 8 | 8 | 5 | 6 | 1 | 6 | 1 | 5 | 9 |
| 2 | -4 | -11 | -9 | 10 | 1 | 8 | 7 | 4 | 1 | 8 | 10 | 5 | 5 | 9 |
| 7 | -10 | -22 | -12 | 6 | 8 | 8 | 8 | 8 | 3 | 10 | 8 | 3 | 8 | 7 |
| 2 | -3 | -9 | -8 | 5 | 2 | 10 | 4 | 2 | 8 | 4 | 8 | 1 | 7 | 6 |
| 9 | 6 | 4 | 5 | 10 | 9 | 1 | 1 | 4 | 4 | 1 | 3 | 4 | 8 | 4 |
| 6 | 10 | 8 | 7 | 6 | 6 | 2 | 4 | 7 | 2 | 5 | 6 | 1 | 8 | 2 |

FIG. 6B

| 117 | 121 | 120 | 115 | 119 | 117 | 123 | 135 | 126 | 116 | 118 | 131 | 129 | 112 | 129 |
|---|---|---|---|---|---|---|---|---|---|---|---|---|---|---|
| 117 | 116 | 125 | 129 | 125 | 122 | 134 | 124 | 111 | 133 | 123 | 132 | 117 | 128 | 131 |
| 119 | 130 | 123 | 124 | 115 | 128 | 129 | 124 | 126 | 132 | 117 | 121 | 128 | 125 | 126 |
| 117 | 128 | 126 | 116 | 126 | 131 | 122 | 126 | 128 | 115 | 132 | 115 | 124 | 127 | 114 |
| 118 | 122 | 124 | 127 | 123 | 121 | 135 | 133 | 128 | 119 | 111 | 127 | 123 | 122 | 125 |
| 114 | 115 | 111 | 122 | 115 | 132 | 118 | 125 | 125 | 119 | 121 | 135 | 119 | 132 | 134 |
| 129 | 138 | 123 | 118 | 133 | 122 | 134 | 131 | 131 | 124 | 131 | 120 | 126 | 124 | 115 |
| 132 | 129 | 126 | 126 | 120 | 124 | 127 | 113 | 116 | 115 | 116 | 128 | 122 | 120 | 115 |
| 127 | 127 | 112 | 119 | 136 | 121 | 126 | 122 | 129 | 113 | 126 | 127 | 133 | 127 | 132 |

FIG. 7A

| 3 | 9 | 7 | 6 | 2 | 9 | 5 | 4 | 4 | 9 | 2 | 7 | 8 | 8 | 9 |
|---|---|---|---|---|---|---|---|---|---|---|---|---|---|---|
| 7 | 10 | 10 | 1 | 5 | 9 | 3 | 9 | 10 | 2 | 9 | 1 | 7 | 10 | 3 |
| 9 | 3 | 8 | 7 | 5 | 9 | 1 | 1 | 9 | 1 | 4 | 1 | 1 | 8 | 9 |
| 7 | 6 | 2 | 9 | 9 | 8 | 2 | 10 | 3 | 7 | 1 | 5 | 9 | 5 | 10 |
| 6 | 5 | 5 | 5 | 6 | 3 | 2 | 1 | 2 | 9 | 10 | 8 | 4 | 8 | 6 |
| 6 | 5 | 10 | 10 | 10 | 4 | 10 | 9 | 10 | 3 | 9 | 3 | 10 | 5 | 3 |
| 7 | 1 | 5 | 5 | 4 | 4 | 1 | 4 | 2 | 2 | 5 | 6 | 1 | 3 | 5 |
| 7 | 8 | 8 | 5 | 9 | 2 | 10 | 8 | 10 | 10 | 5 | 1 | 7 | 10 | 10 |
| 5 | 7 | 10 | 6 | 2 | 8 | 8 | 9 | 3 | 9 | 9 | 3 | 3 | 2 | 4 |

FIG. 7B

| 105 | 111 | 114 | 108 | 107 | 108 | 115 | 122 | 111 | 103 | 106 | 118 | 121 | 102 | 120 |
|---|---|---|---|---|---|---|---|---|---|---|---|---|---|---|
| 105 | 107 | 118 | 121 | 115 | 109 | 123 | 110 | 100 | 124 | 112 | 121 | 106 | 119 | 119 |
| 111 | 118 | 108 | 110 | 101 | 119 | 117 | 114 | 118 | 123 | 108 | 114 | 117 | 117 | 117 |
| 109 | 116 | 117 | 102 | 116 | 119 | 111 | 112 | 119 | 102 | 126 | 108 | 112 | 117 | 100 |
| 107 | 109 | 111 | 118 | 110 | 107 | 127 | 119 | 115 | 112 | 102 | 118 | 109 | 108 | 113 |
| 101 | 108 | 98 | 111 | 108 | 121 | 104 | 113 | 116 | 109 | 110 | 126 | 107 | 119 | 121 |
| 123 | 128 | 109 | 104 | 125 | 113 | 128 | 123 | 119 | 113 | 124 | 106 | 117 | 116 | 105 |
| 123 | 123 | 120 | 112 | 110 | 113 | 119 | 103 | 108 | 103 | 102 | 118 | 114 | 111 | 106 |
| 120 | 112 | 101 | 113 | 123 | 110 | 116 | 116 | 123 | 105 | 118 | 117 | 119 | 118 | 124 |

FIG. 8A

| 15 | 19 | 13 | 13 | 14 | 18 | 13 | 17 | 19 | 22 | 14 | 20 | 16 | 18 | 18 |
|---|---|---|---|---|---|---|---|---|---|---|---|---|---|---|
| 19 | 19 | 17 | 9 | 15 | 22 | 14 | 23 | 21 | 11 | 20 | 12 | 18 | 19 | 15 |
| 17 | 15 | 23 | 21 | 19 | 18 | 13 | 11 | 17 | 10 | 13 | 8 | 12 | 16 | 18 |
| 15 | 18 | 11 | 23 | 19 | 20 | 13 | 24 | 12 | 20 | 7 | 12 | 21 | 15 | 24 |
| 17 | 18 | 18 | 14 | 19 | 17 | 10 | 15 | 15 | 16 | 19 | 17 | 18 | 22 | 18 |
| 19 | 12 | 23 | 21 | 17 | 15 | 24 | 21 | 19 | 13 | 20 | 12 | 22 | 18 | 16 |
| 13 | 11 | 19 | 19 | 12 | 13 | 7 | 12 | 14 | 13 | 12 | 20 | 10 | 11 | 15 |
| 16 | 14 | 14 | 19 | 19 | 13 | 18 | 18 | 18 | 22 | 19 | 11 | 15 | 19 | 19 |
| 12 | 22 | 21 | 12 | 15 | 19 | 18 | 15 | 9 | 17 | 17 | 13 | 17 | 11 | 12 |

FIG. 8B

| 133 | 138 | 131 | 129 | 137 | 129 | 152 | 146 | 145 | 133 | 139 | 154 | 157 | 122 | 145 |
|---|---|---|---|---|---|---|---|---|---|---|---|---|---|---|
| 132 | 139 | 150 | 148 | 136 | 150 | 156 | 146 | 121 | 158 | 139 | 159 | 133 | 149 | 144 |
| 144 | 159 | 145 | 149 | 136 | 145 | 140 | 145 | 148 | 146 | 143 | 146 | 152 | 146 | 138 |
| 136 | 157 | 138 | 135 | 139 | 151 | 141 | 140 | 155 | 142 | 160 | 125 | 147 | 139 | 136 |
| 144 | 141 | 144 | 155 | 147 | 132 | 146 | 146 | 157 | 137 | 132 | 156 | 138 | 135 | 143 |
| 134 | 139 | 139 | 149 | 137 | 153 | 137 | 145 | 141 | 144 | 149 | 150 | 138 | 154 | 144 |
| 158 | 162 | 146 | 128 | 148 | 146 | 163 | 143 | 155 | 142 | 146 | 135 | 149 | 141 | 130 |
| 158 | 145 | 140 | 145 | 148 | 149 | 141 | 131 | 133 | 137 | 131 | 141 | 135 | 144 | 144 |
| 145 | 156 | 130 | 137 | 161 | 133 | 137 | 149 | 139 | 125 | 148 | 152 | 152 | 142 | 156 |

FIG. 9A

| -13 | -8 | -4 | -8 | -16 | -3 | -24 | -7 | -5 | -8 | -19 | -16 | -20 | -2 | -7 |
|---|---|---|---|---|---|---|---|---|---|---|---|---|---|---|
| -8 | -13 | -15 | -18 | -6 | -19 | -19 | -13 | 0 | -23 | -7 | -26 | -9 | -11 | -10 |
| -16 | -26 | -14 | -18 | -16 | -8 | -10 | -20 | -13 | -13 | -22 | -24 | -23 | -13 | -3 |
| -12 | -23 | -10 | -10 | -4 | -12 | -17 | -4 | -24 | -20 | -27 | -5 | -14 | -7 | -12 |
| -20 | -14 | -15 | -23 | -18 | -8 | -9 | -12 | -27 | -9 | -11 | -21 | -11 | -5 | -12 |
| -14 | -19 | -18 | -17 | -12 | -17 | -9 | -11 | -6 | -22 | -19 | -12 | -9 | -17 | -7 |
| -22 | -23 | -18 | -5 | -11 | -20 | -28 | -8 | -22 | -16 | -10 | -9 | -22 | -14 | -10 |
| -19 | -8 | -6 | -14 | -19 | -23 | -4 | -10 | -7 | -12 | -10 | -12 | -6 | -14 | -19 |
| -13 | -22 | -8 | -12 | -23 | -4 | -3 | -18 | -7 | -3 | -13 | -22 | -16 | -13 | -20 |

TOUCH DEVICE AND OPERATING METHOD THEREOF

BACKGROUND OF THE INVENTION

1. Field of the Invention

The invention relates to a touch device and an operating method thereof, and more particularly, to a touch device capable of automatically re-calibrating a plurality of data baseline values and an operating method thereof.

2. Description of Related Art

With rapid development and application of information technology, wireless mobile communication technology and information appliance, input devices of many electronic devices have transformed from keyboards and mice to touch panels in order to achieve portability, light weight, and humanized operation. Conventional touch panels are generally classified into capacitive touch panel and resistance touch panel, wherein sensing effect of the capacitive touch panels is superior, thus becoming the main stream of the conventional touch panels.

The capacitive touch panel utilizes the use of finger or conductive material to be near or to touch the touch panel, causing change in capacitance of the touch panel, so as to determine a touch point of the capacitive touch panel through the change in capacitance. Generally, an initialization on the capacitive touch panel is performed by the touch device when turning on the electronic device. Then, the capacitive touch panel is assumed to be in a non-touch state by the touch device, and a plurality of touch data of the capacitive touch panel is recorded as data baseline values for determining the change in capacitance.

However, during the initialization of the capacitive touch panel, if the capacitive touch panel is near or attached by conductive material (such as water or metal), the data baseline values recorded by the touch device may result in a misjudgment of the touch point. Otherwise, the capacitance of the capacitive touch panel may also increase or decrease along with temperature when usage environment of the touch device is substantially changed (such as substantial temperature change), thus causing the touch device to misjudge the touch point of the capacitive touch panel.

SUMMARY OF THE INVENTION

The invention provides a touch device and an operating method for the touch device capable of re-calibrating a plurality of data baseline values of a touch panel when a plurality of detected touch data appears to be abnormal, so as to avoid a misjudgment of the touch point.

The invention provides a touch device, comprising a touch panel and a touch detecting unit. The touch panel has a plurality of column electrodes and a plurality of row electrodes, and the column electrodes are interlaced with the row electrodes to form a plurality of touch areas. The touch detecting unit is coupled to the touch panel, and the data baseline values of the touch panel are calibrated and set during the initialization. A plurality of touch data of the touch panel is obtained by the touch detecting unit after scanning the touch panel, so as to calculate a plurality of touch values according to the data baseline values and the touch data, and to detect a touch point according to the touch values. Moreover, the data baseline values of the touch panel are re-calibrated and reset by the touch detecting unit after the touch data are complied with a re-calibration requirement.

The invention also provides an operating method for a touch device comprising the following steps. A plurality of data baseline values of the touch panel is calibrated and set during an initialization of a touch panel. A plurality of touch data of the touch panel is obtained after scanning the touch panel. A plurality of touch values corresponding to the touch panel is calculated according to the data baseline values and the touch data. A touch point is detected according to the touch values. When the touch data are complied with a re-calibration requirement, the data baseline values of the touch panel are re-calibrated and reset.

In an embodiment, the data baseline values are a plurality of capacitances corresponding to the column electrodes and the row electrodes of the touch panel during the initialization when the touch panel is driven by a self capacitance positioning mode.

In an embodiment, the re-calibration requirement is that at least one of the touch data is less than or equal to the deviation between the corresponding data baseline value and a re-calibration threshold for a continuous period of n frames, wherein n is a positive value greater than or equal to 10.

In an embodiment, the data baseline values are a plurality of capacitances corresponding to the touch areas during the initialization when the touch panel is driven by a mutual capacitance positioning mode.

In an embodiment, the re-calibration requirement is that at least one of the touch data is greater than or equal to the sum of the corresponding data baseline value and a re-calibration threshold for a continuous period of n frames, wherein n is a positive value greater than or equal to 10.

In an embodiment, the re-calibration requirement is that the touch data increase or decrease with time, and at least one of the touch data is greater than or equal to the sum of the corresponding data baseline value and a re-calibration threshold, or is less than or equal to the deviation between the corresponding data baseline value and a re-calibration threshold, for a continuous period of n frames.

In an embodiment, the re-calibration requirement is that the touch point is detected according to the touch values when the touch panel is driven by one of a self capacitance positioning mode and a mutual capacitance positioning mode, and the touch point is not detected according to the touch values when the touch panel is driven by another one of the self capacitance positioning mode and the mutual capacitance positioning mode.

In light of the forgoing, the touch device and the operating method for the touch device re-calibrate the data the baseline values of the touch panel when the touch data are complied with the re-calibration requirement, so as to avoid the misjudgment of the touch point causing by the incorrect data baseline value or the inappropriate data baseline value.

The abovementioned features and advantages of the invention will become more obvious and better understood with regard to the following description of the exemplary embodiments and accompanying drawings in the below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
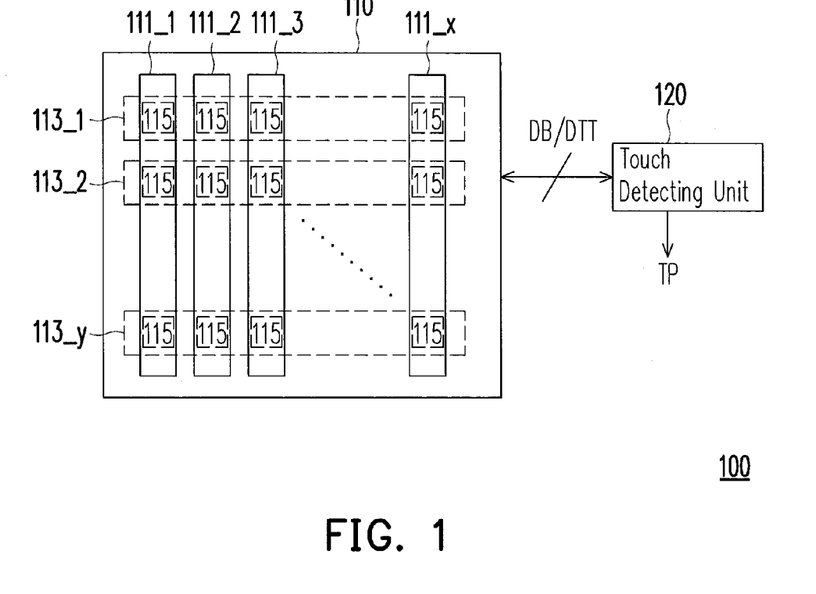
FIG. 1 is a system schematic diagram illustrating a touch device in accordance with an embodiment.

FIG. 1 is a system schematic diagram illustrating a touch device in accordance with an embodiment. With reference to FIG. 1, in the embodiment, a touch device 100 comprises a touch panel 110 and a touch detecting unit 120. Herein, the touch panel 110 is a projected capacitive touch panel for instance, namely the touch panel 110 has a plurality of column electrodes 111_1~111_$x$ and a plurality of row electrodes 113_1~113_$y$, and the column electrodes 111_1~111_$x$ are interlaced with the row electrodes 113_1~113_$y$ to form a plurality of touch areas 115, wherein x and y is a positive number.

The touch detecting unit 120 is coupled to the touch panel 110. During an initialization of the touch device 100, the touch detecting unit 120 assumes that the touch panel 110 is touch detecting not being touched, and then a plurality of data baseline values DB of the touch panel 110 is calibrated and set by the touch detecting unit 120. Moreover, the touch detecting unit 120 is capable of scanning the touch panel 110 after the data baseline values DB are set in order to obtain a plurality of touch data DTT of the touch panel 110. Wherein, the calibration processes (e.g. detecting processes) for the data baseline values DB and the touch data DTT are the same, and the data baseline values DB are the data obtained during the initialization of the touch panel 110, the touch data DTT are the data obtained after completing the initialization of the touch panel 110.

Next, the touch detecting unit 120 may calculate a plurality of touch values according to the data baseline values DB and the touch data DTT and detect a touch point TP on the touch panel 110 according to the calculated touch values. In addition, the data baseline values DB of the touch panel 110 are re-calibrated and reset by the touch detecting unit 120 after the touch data DTT are complied with a re-calibration requirement. Wherein, the re-calibration requirement represents that the touch data DTT detected by the touch detecting unit 120 are appeared to be abnormal (such as substantial increases or decreases, overall increases or decreases) for a continuous period of n frames, herein n may be set as greater than or equal to 10, but is not limited hereto. Moreover, the period of continuous n frames is used for determining whether the abnormality of the touch data DTT is caused by the noise or is caused by the incorrect data baseline values DB or the inappropriate data baseline values DB.

Figure 2:
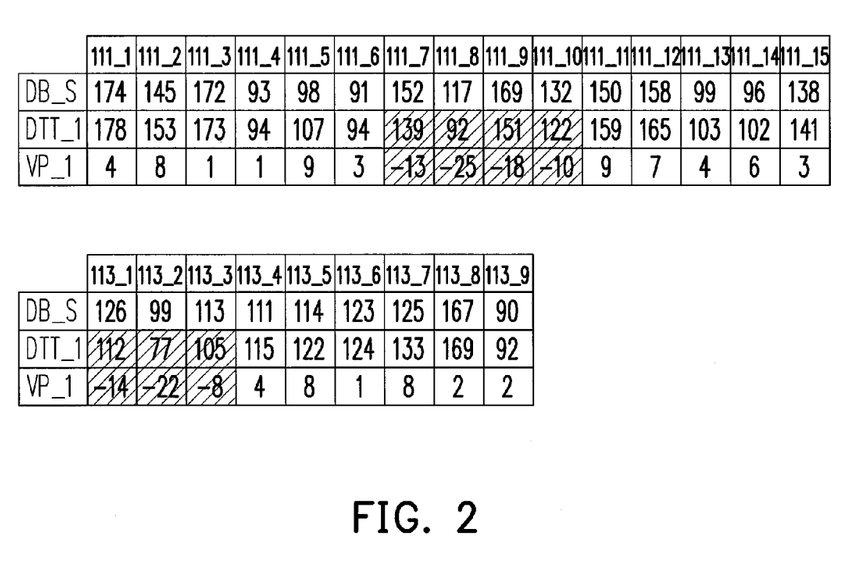
FIG. 2 is a schematic diagram illustrating a plurality of data baseline values, a plurality of touch data and a plurality of touch values of a touch panel from FIG. 1 driven by a self capacitance positioning mode in accordance with an embodiment.

FIG. 2 is a schematic diagram illustrating a plurality of data baseline values, a plurality of touch data and a plurality of touch values of a touch panel from FIG. 1 driven by a self capacitance positioning mode in accordance with an embodiment. With reference to FIG. 1 and FIG. 2, in the embodiment, the touch panel 110 is driven by the self capacitance positioning mode. Namely, the touch detecting unit 120 respectively detects the capacitances of the column electrodes 111_1~111_$x$ and the row electrodes 113_1~113_$y$. Moreover, taking an example that x is 15, y is 9, and the touch detecting unit 120 assumes that the detected capacitances of the column electrodes 111_1~111_15 and the row electrodes 113_1~113_9 during the initialization are the data baseline values DB_S, as shown in FIG. 2.

When the touch detecting unit 120 drives the touch panel 110 with the self capacitance positioning mode, the touch data (such as DTT_1) of the column electrodes 111_1~111_15 and the row electrodes 113_1~113_9 are generally greater than or equal to the corresponding data baseline values DB_S. Moreover, the touch values (such as VP_1) of the column electrodes 111_1~111_15 and the row electrodes 113_1~113_9 are generally indicated with positive values. Namely, the touch detecting unit 120 may obtain the touch values (such as VP_1) by subtracting the corresponding data baseline values DB_S from the touch data (such as DTT_1) of the column electrodes 111_1~111_15 and the row electrodes 113_1~113_9.

However, if the touch panel 110 is to be near to or attached by conductive material during the initialization, a portion of the data baseline values DB_S touch detecting influencing by conductive material is higher, which the data baseline values DB_S recorded by the touch detecting unit 120. Moreover, the touch data (such as DTT_1) of a portion of the column electrodes 111_1~111_15 and a portion of the row electrodes 113_1~113_9 may be less than or equal to the corresponding data baseline values DB_S when conductive material is away from the touch panel 110 or is detached from the touch panel 110.

Because touching can cause the touch data (such as DTT_1) of a portion of the column electrodes 111_1~111_15 and a portion of the row electrodes 113_1~113_9 to increase in substantial magnitude; therefore, the touch detecting unit 120 may ignore and not respond to the influence of the touch data (such as DTT_1) decrease when reduction magnitude of the touch data (such as DTT_1) of the column electrodes 111_1~111_15 and the row electrodes 113_1~113_9 influencing by conductive material is relatively low. However, precision of the touch detecting unit 120 in detecting the touch point TP may be influenced when reduction magnitude of the touch data (such as DTT_1) of the column electrodes 111_1~111_15 and the row electrodes 113_1~1139 is relatively high, and thus the data baseline values DB_S of the column electrodes 111_1~111_15 and the row electrodes 113_1~113_9 may be re-calibrated in order to eliminate the influence of the touch data (such as DTT_1) decrease. Accordingly, the embodiment may set a re-calibration threshold for determining whether to re-calibrate the data baseline values DB_S, and the re-calibration of the data baseline values DB_S is generally performed during a non-touch screen period of the touch panel 110.

In the embodiment, the re-calibration threshold is set as 20. As shown by the slash grid in FIG. 2, the touch data DTT_1 of the column electrodes 111_7~111_10 and the row electrodes 113_1~113_2 are less than the corresponding data baseline values DB_S. Wherein, the touch data DTT_1 of the column electrodes 111_8 and the row electrodes 113_2 are less than the deviation between the corresponding data baseline value DB_S and the re-calibration threshold. Namely, at least one of the touch data DTT_1 of the column electrodes 111_1~111_15 and the row electrodes 113_1~113_9 is less than or equal to the deviation between the corresponding data baseline value DB_S and the re-calibration threshold.

When at least one of the touch data DTT_1 of the column electrodes 111_1~111_15 and the row electrodes 113_1~113_9 is less than or equal to the deviation between the corresponding data baseline value DB_S and the re-calibration threshold for a continuous period of n frames, the data baseline values DB_S of the column electrodes 111_1~111_15 and the row electrodes 113_1~113_9 are re-calibrated by the touch detecting unit 120 in order to avoid the misjudgment of the touch point TP causing by the incorrect data baseline values DB_S.

In an embodiment, the touch values VP_1 are set as capable of being negative values, and namely, the touch values VP_1 may be negative values (such as shown by the slash grid in FIG. 2) when the touch data DTT_1 of the column electrodes 111_1~111_15 and the row electrodes 113_1~113_9 are less than the corresponding data baseline values DB_S. Moreover, the touch detecting unit 120 may determine whether to re-calibrate the data baseline values DB_S of the column electrodes 111_1~111_15 and the row electrodes 113_1~113_9 according to the touch values VP_1 of the column electrodes 111_1~111_15 and the row electrodes 113_1~113_9. In other word, the data baseline values DB_S of the column electrodes 111_1~111_15 and the row electrodes 113_1~113_9 are re-calibrated by the touch detecting unit 120 when at least one absolute values of the negative value portion of the touch values VP_1 of the column electrodes 111_1~111_15 and the row electrodes 113_1~113_9 is greater than or equal to the re-calibration threshold for a continuous period of n frames.

Figure 3:
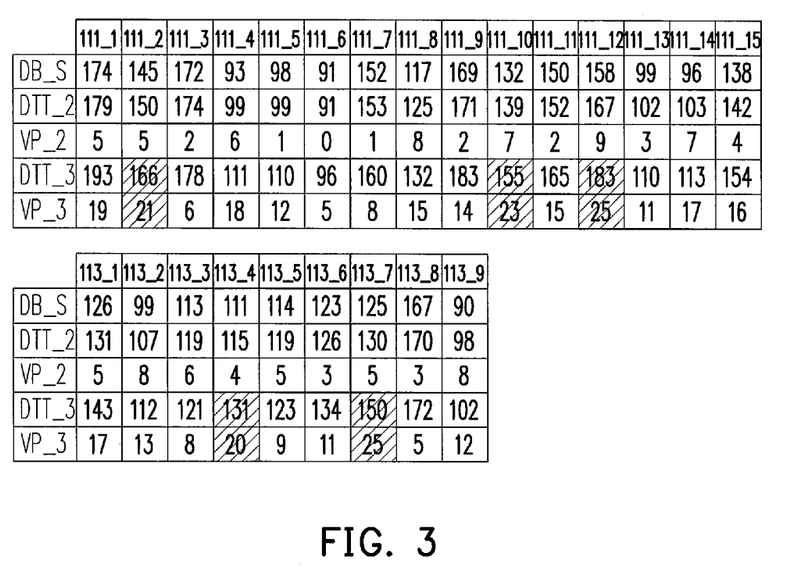
FIG. 3 is a schematic diagram illustrating the data baseline values, the touch data and the touch values of the touch panel from FIG. 1 driven by the self capacitance positioning mode in accordance with another embodiment.

FIG. 3 is a schematic diagram illustrating the data baseline values, the touch data and the touch values of the touch panel from FIG. 1 driven by the self capacitance positioning mode in accordance with another embodiment. With reference to FIG. 1 and FIG. 3, in the embodiment, the touch panel 110 is driven by the self capacitance positioning mode. Herein, x is 15 and y is 9 for instance, and the data baseline values DB_S, the touch data DTT_2, DTT_3 and the touch values VP_2, VP_3 of the column electrodes 111_1~111_15 and the row electrodes 113_1~113_9 may be shown as in FIG. 3. Wherein, the detecting time of the touch data DTT_2 is earlier than the detecting time of the touch data DTT_3. Namely, the corresponding time of the touch values VP_2 is earlier than the corresponding time of the touch values VP_3.

Because the touch data (such as DTT_2, DTT_3) of the column electrodes 111_1~111_15 and the row electrodes 113_1~113_9 may change with the influence of ambient temperature, the touch data (such as DTT_2, DTT_3) of the column electrodes 111_1~111_15 and the row electrodes 113_1~113_9, under the condition of ambient temperature changes, may overall increase or overall decrease with time. Moreover, the touch detecting unit 120 may result in a misjudgment of the touch point TP of the touch panel 110 when the increasing or decreasing magnitude of the touch data (such as DTT_2, DTT_3) of the column electrodes 111_1~111_15 and the row electrodes 113_1~113_9 is too high, and then the data baseline values DB_S of the column electrodes 111_1~111_15 and the row electrodes 113_1~113_9 may be re-calibrated in order to eliminate the influence due to the increasing or decreasing magnitude of the touch data (such as DTT_2, DTT_3) being too high. Herein, the embodiment may set a re-calibration threshold for determining whether to perform the re-calibration of the data baseline values DB_S, and the re-calibration of the data baseline values DB_S is generally performed during the non-touch screen period of the touch panel 110.

In the embodiment, the re-calibration threshold is set as 20. As shown in FIG. 3, the touch data DTT_3 of the column electrodes 111_1~111_15 and the row electrodes 113_1~113_9 are all higher than the touch data DTT_2, and namely, the touch data (such as DTT_2, DTT_3) of the column electrodes 111_1~111_15 and the row electrodes 113_1~113_9 are all increasing with time. Moreover, the touch data DTT_3 of the column electrodes 111_2, 11_10, 111_12 and the row electrodes 113_4, 113_7 are greater than or equal to the sum of the corresponding data baseline value DB_S and the re-calibration threshold (with reference to the slash grid shown in FIG. 3), and namely, at least one of the touch data DTT_3 of the column electrodes 111_1~111_15 and of the row electrodes 113_1~113_9 is greater than or equal to the sum of the corresponding data baseline value DB_S and the re-calibration threshold.

When the touch data (such as DTT_2, DTT_3) of the column electrodes 111_1~111_15 and the row electrodes 113_1~113_9 overall increase with time, and at least one of the touch data DTT_3 of the column electrodes 111_2, 11_10, 111_12 and the row electrodes 113_4, 113_7 is greater than or equal to the sum of the corresponding data baseline value DB_S and the re-calibration threshold for a continuous period of n frames, the data baseline values DB_S of the column electrodes 111_1~111_15 and the row electrodes 113_1~113_9 are re-calibrated by the touch detecting unit 120 in order to avoid the misjudgment of the touch point TP causing by the touch data (such as DTT_2, DTT_3 which are influenced by the ambient temperature changes to increase with time.

In an embodiment, the touch detecting unit 120 may determine whether to re-calibrate the data baseline values DB_S of the column electrodes 111_1~111_15 and the row electrodes 113_1~113_9 according to the touch values VP_2 and VP_3 of the column electrodes 111_1~111_15 and the row electrodes 113_1~113_9. In other word, the data baseline values DB_S of the column electrodes 111_1~111_15 and the row electrodes 113_1~113_9 are re-calibrated by the touch detecting unit 120 when the touch values VP_3 of the column electrodes 111_1~111_15 and the row electrodes 113_1~113_9 are all greater than the touch values VP_2, and at least one of the touch values VP_3 of the column electrodes 111_1~111_15 and the row electrodes 113_1~113_9 is greater than or equal to the re-calibration threshold for a continuous period of n frames.

Figure 4:
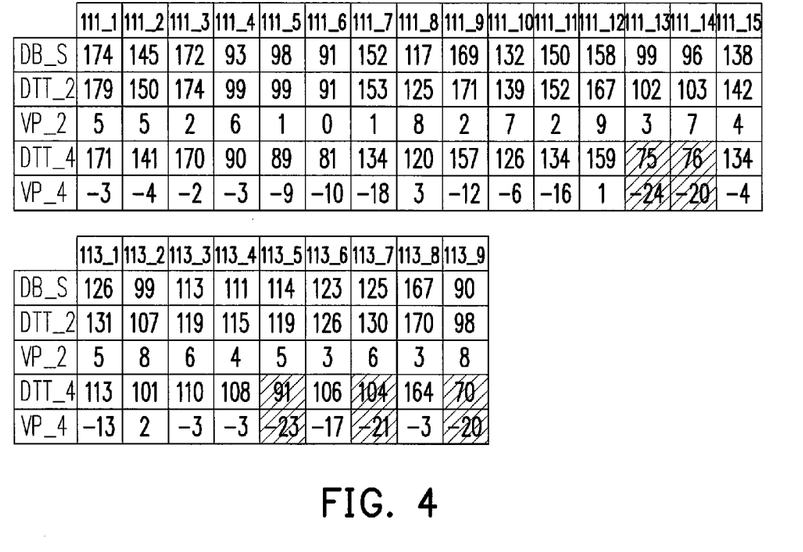
FIG. 4 is a schematic diagram illustrating a plurality of data baseline values, a plurality of touch data and a plurality of touch values of the touch panel from FIG. 1 driven by the self capacitance positioning mode in accordance with further another embodiment.

FIG. 4 is a schematic diagram illustrating a plurality of data baseline values, a plurality of touch data and a plurality of touch values of the touch panel from FIG. 1 driven by the self capacitance positioning mode in accordance with further another embodiment. With reference to FIG. 1 and FIG. 4, in the embodiment, the touch panel 110 is driven by the self capacitance positioning mode. Herein, x is 5 and y is 9 for instance, and the data baseline values DB_S, the touch data DTT_2, DTT_4 and the touch values VP_2, VP_4 of the column electrodes 111_1~111_15 and the row electrodes 113_1~113_9 may be as shown in FIG. 4. Wherein, the detecting time of the touch data DTT_2 is earlier than the detecting time of the touch data DTT_4. Namely, the corresponding time of the touch values VP_2 is earlier than the corresponding time of the touch values VP_4 corresponding. Moreover, according to the embodiment illustrated in FIG. 3, the present embodiment may correspondingly set a re-calibration threshold for determining whether to perform the re-calibration of the data baseline values DB_S, and the re-calibration of the data baseline values DB_S is generally performed during the non-touch screen period of the touch panel 110.

In the embodiment, the re-calibration threshold is set as 20. The touch data DTT_4 of the column electrodes 111_1~111_15 and the row electrodes 113_1~113_9, shown in FIG. 4, are all lower than the touch data DTT_2, and namely, the touch data (such as DTT_2, DTT_4) of the column electrodes 111_1~111_15 and the row electrodes 113_1~113_9 are all decreasing with time. Moreover, the touch data DTT_4 of the column electrodes 111_13, 111_14 and the row electrodes 113_5, 113_7, 113_9 are less than or equal to the deviation between the corresponding data baseline value DB_S (with reference to the slash grid illustrated in FIG. 4) and the re-calibration threshold. Namely, at least one of the touch data DTT_4 of the column electrodes 111_1~111_15 and the row electrodes 113_1~113_9 is less than or equal to the deviation between the corresponding data baseline value DB_S and the re-calibration threshold.

When all the touch data (such as DTT_2, DTT_4) of the 111_1~111_15 and the row electrodes 113_1~113_9 overall decrease with time, and at least one of the touch data DTT_4 of the column electrodes 111_2, 11_10, 111_12 and the row electrodes 113_4, 113_7 is less than or equal to the deviation between the corresponding data baseline value DB_S and the re-calibration threshold for a continuous period of n frames, the data baseline values DB_S of the column electrodes 111_1~111_15 and the row electrodes 113_1~113_9 are re-calibrated by the touch detecting unit 120 in order to avoid the misjudgment of the touch point TP causing by the touch data (such as DTT_2, DTT_4), which are influenced by the ambient temperature changes to overall decrease with time.

In an embodiment, the touch detecting unit 120 may determine whether to re-calibrate the data baseline values DB_S of the column electrodes 111_1~111_15 and the row electrodes 113_1~113_9 according to the touch values VP_2 and VP_4 of the column electrodes 111_1~111_15 and the row electrodes 113_1~113_9. In other word, the data baseline values DB_S of the column electrodes 111_1~111_15 and the row electrodes 113_1~113_9 are re-calibrated by the touch detecting unit 120 when the touch values VP_4 of the column electrodes 111_1~111_15 and the row electrodes 113_1~113_9 are all less than the touch values VP_2, and at least one absolute values of the negative value portion of the touch values VP_4 of the column electrodes 111_1~111_15 and the row electrodes 113_1~113_9 is greater than or equal to the re-calibration threshold for a continuous period of n frames.

Figure 5:
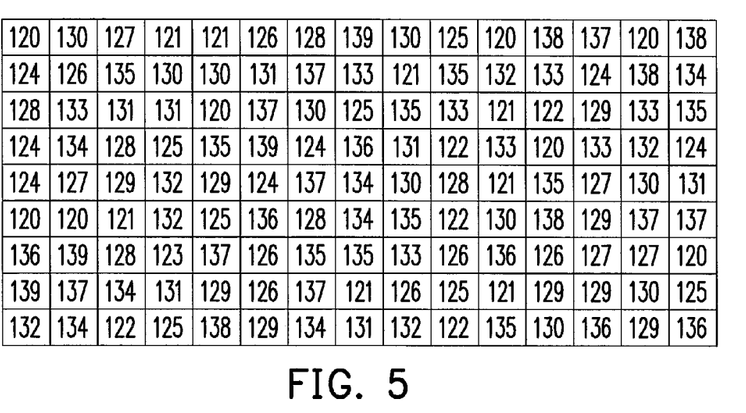
FIG. 5 is a schematic diagram illustrating a plurality of data baseline values of the touch panel from FIG. 1 driven by a mutual capacitance positioning mode in accordance with an embodiment.
Figure 6A:
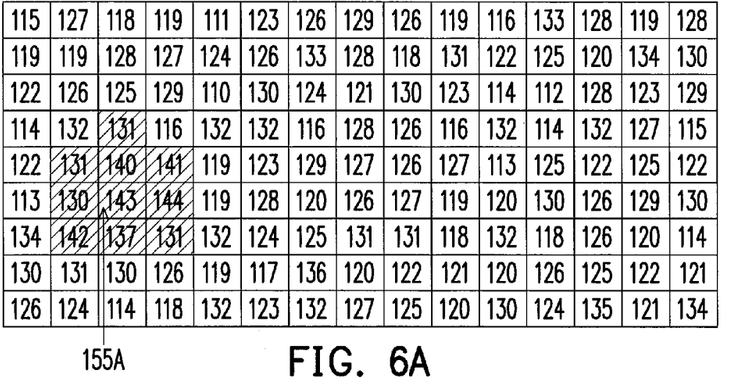
FIGS. 6A and 6B are two schematic diagrams illustrating a plurality of touch data and a plurality of touch values of the touch panel from FIG. 1 driven by the mutual capacitance positioning mode in accordance with an embodiment.
Figure 6B:
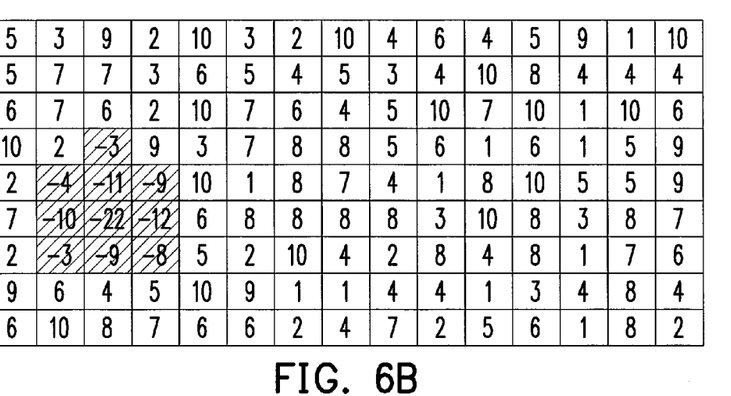

FIG. 5 is a schematic diagram illustrating a plurality of data baseline values of the touch panel from FIG. 1 driven by a mutual capacitance positioning mode in accordance with an embodiment. FIGS. 6A and 6B are two schematic diagrams illustrating a plurality of touch data and a plurality of touch values of the touch panel from FIG. 1 driven by the mutual capacitance positioning mode in accordance with an embodiment. With reference to FIG. 1, FIG. 5, FIG. 6A and FIG. 6B, in the embodiment, the touch panel 110 is driven by the mutual capacitance positioning mode. Namely, the detection unit 120 detects the capacitances of touch areas 115 through the column electrodes 111_1~111_x and the row electrodes 113_1~113_y. Moreover, herein taking for example that x is 15, y is 9, and the touch detecting unit 120 assumes that the detected capacitances of the touch areas 115 during the initialization as the data baseline values DB (as shown in FIG. 5).

When the touch detecting unit 120 drives the touch panel 110 with the mutual capacitance positioning mode, each of the touch data DTT (as shown in FIG. 6A) of the touch areas 115 is generally less than or equal to the corresponding data baseline value DB (as shown in FIG. 5). Moreover, each of the touch values of the touch areas 115 (as shown in FIG. 6B) is generally indicated as positive value, and namely, the touch detecting unit 120 may subtract the corresponding touch data DTT (as shown in FIG. 6A) from each of the data baseline values DB of the touch areas 115 (as shown in FIG. 5).

Furthermore, if the touch panel 110 during the initialization is near to or attached by conductive material, the touch detecting unit 120 may record the incorrect data baseline values DB (as shown in FIG. 5), thus influencing the precision of the touch detecting unit 120 in judging the touch point TP. Then, according to the embodiment illustrated in FIG. 2, the present embodiment may correspondingly set a re-calibration threshold for determining whether to perform the re-calibration of the data baseline values DB (as shown in FIG. 5), and the re-calibration of the data baseline values DB (as shown in FIG. 5) is generally performed during a non-touch screen period of the touch panel 110.

In the embodiment, the re-calibration threshold is set as 20. As shown by the slash grid in FIG. 6A, a portion of the touch data DTT of the touch areas 115, under the influence of conductive material, are greater than or equal to the corresponding data baseline value DB (as shown in FIG. 5). Wherein, the touch data DTT (as shown in FIG. 6A) of the touch areas 115A are greater than the sum of the corresponding data baseline value DTT (121 as shown in FIG. 5) and the re-calibration threshold. Namely, at least one of the touch data DTT (as shown in FIG. 6A) of the touch areas 115 is greater than or equal to the sum of the corresponding data baseline value DB (as shown in FIG. 5) and the re-calibration threshold.

When at least one of the touch data DTT (as shown in FIG. 6A) of the touch areas 115 is greater than or equal to the sum of the corresponding data baseline value DB (as shown FIG. 5) and the re-calibration threshold for a continuous period of n frames, the data baseline values DB (as shown in FIG. 5) of the touch areas 115 are re-calibrated by the touch detecting unit 120 in order to avoid the misjudgment of the touch point TP causing by the incorrect data baseline values DB.

In an embodiment, the touch values (as shown in FIG. 6B) are set as capable of being negative values, and namely, the touch values (as shown FIG. 6B) may be negative values (as shown by the slash grid in FIG. 6B) when the touch data DTT (as shown in FIG. 6A) of the touch areas 115 are greater than the corresponding data baseline value DB (as shown in FIG. 5). Moreover, the touch detecting unit 120 may determine whether to re-calibrate the data baseline values DB (as shown in FIG. 5) of the touch areas 115 according to the touch values (as shown in FIG. 6B) of the touch areas 115. In other word, when at least one absolute values of the negative value portion of the touch values (as shown in FIG. 6B) of the touch areas 115 is greater than or equal to the re-calibration threshold for a continuous period of n frames, the data baseline values DB (as shown in FIG. 5) of the touch areas 115 are re-calibrated by the touch detecting unit 120.

Figure 7A:
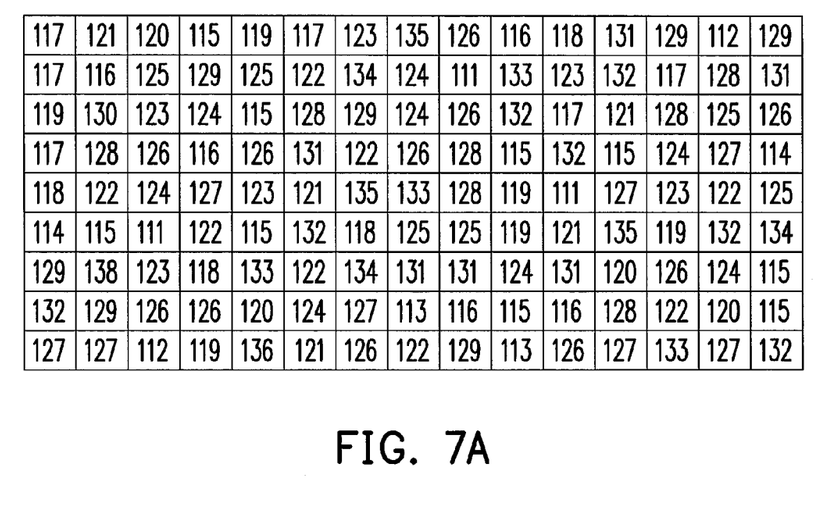
FIGS. 7A and 7B are two schematic diagrams illustrating a plurality of touch data and a plurality of touch values of the touch panel from FIG. 1 driven by the mutual capacitance positioning mode in accordance with another embodiment.
Figure 7B:
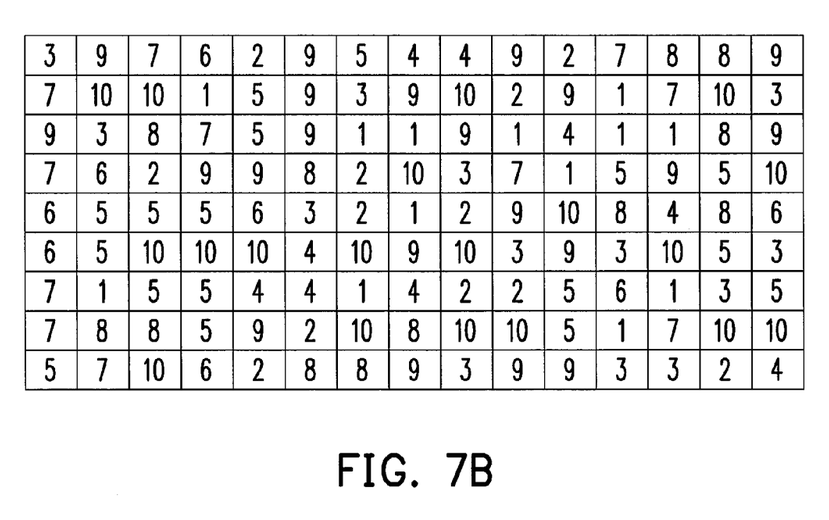
Figure 8A:
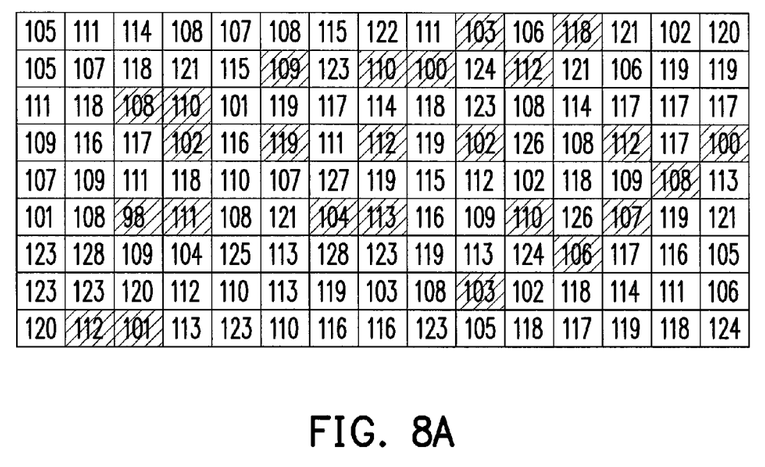
FIGS. 8A and 8B are two schematic diagrams illustrating a plurality of touch data and a plurality of touch values of the touch panel from FIG. 1 driven by the mutual capacitance positioning mode in accordance with further another embodiment.
Figure 8B:
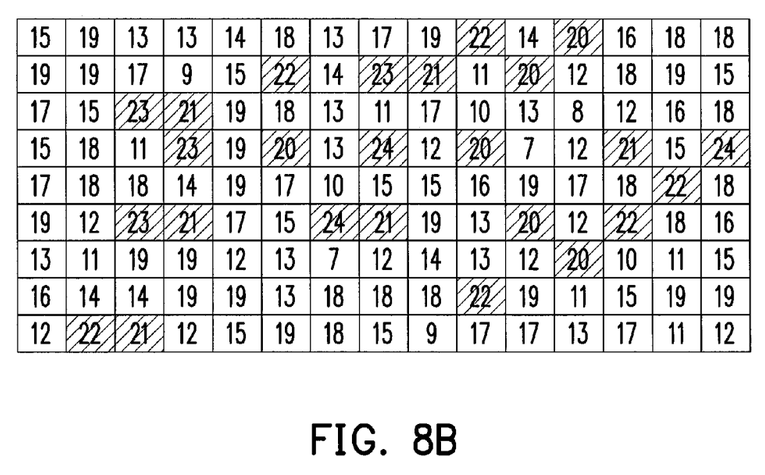

FIGS. 7A and 7B are two schematic diagrams illustrating a plurality of touch data and a plurality of touch values of the touch panel from FIG. 1 driven by the mutual capacitance positioning mode in accordance with another embodiment. FIGS. 8A and 8B are two schematic diagrams illustrating a plurality of touch data and a plurality of touch values of the touch panel from FIG. 1 driven by the mutual capacitance positioning mode in accordance with further another embodiment. With reference to FIG. 1, FIG. 5, FIG. 7A, FIG. 7B, FIG. 8A, and FIG. 8B, in the embodiment, the touch panel 110 is driven by the mutual capacitance positioning mode. Herein, x is 15 and y is 9 for instance, wherein the detecting time of touch data DTT shown in FIG. 7A is earlier than the detecting of the touch data DTT shown in FIG. 8A. Namely, the corresponding time of the touch values shown in FIG. 7B is earlier than the corresponding of the touch values shown in FIG. 8B.

When the touch data DTT (as shown in FIGS. 7A and 8A) of the touch areas 115 is influenced by the ambient temperature and changes to increase or decrease with time, the touch detecting unit 120 may result in a misjudgment of the touch point TP of the touch panel 110. Then, according to the embodiment illustrated in FIG. 3, the present embodiment may correspondingly set a re-calibration threshold for determining whether to perform the re-calibration of the data baseline values DB (as shown in FIG. 5), and the re-calibration of the data baseline values DB (as shown in FIG. 5) is generally performed during a non-touch screen period of the touch panel 110.

In the embodiment, the re-calibration threshold is set as 20. The touch data DTT of the touch areas 115 shown in FIG. 8A are all lower than the corresponding touch data DTT of the touch areas 115 shown in FIG. 7A, and namely, the touch data DTT (as shown in 7A and 8A) of the touch areas 115 are all decreasing with time. Moreover, a portion of the touch data DTT of the touch areas 115 are less than or equal to the deviation between corresponding data baseline value DB (as shown in FIG. 5) and the re-calibration threshold (with reference to the slash grid shown in FIG. 8A). Namely, at least one of the touch data DTT of the touch areas 115 is less than or equal to the deviation between the corresponding data baseline value DB and the re-calibration threshold.

When the touch data DTT (as shown in 7A and 8A) of the touch areas 115 are all decreasing with time, and at least one of the touch data DTT of the touch areas 115 is less than or equal to the deviation between the corresponding data baseline value DB and the re-calibration threshold for a continuous period of n frames, the data baseline values DB (as shown in FIG. 5) of the touch areas 115 are re-calibrated by the touch detecting unit 120 in order to avoid the misjudgment of the touch point TP causing by the touch data DTT (as shown in 7A and 8A), which are influenced by the ambient temperature changes to overall decrease with time.

In an embodiment, the touch detecting unit 120 may determine whether to re-calibrate the data baseline values DB (as shown in FIG. 5) of touch areas 115 according to the touch values (as shown in 7B and 8B) of the touch areas 115. In other word, when the touch values of the touch areas 115 shown in FIG. 8B are all greater than the corresponding touch values of the same touch areas 115 shown in FIG. 7B, and at least one of the touch values of the touch areas 115 shown in FIG. 8B is greater than or equal to the re-calibration threshold for a continuous period of n frames, the data baseline values DB (as shown in FIG. 5) of the touch areas 115 are re-calibrated by the touch detecting unit 120.

Figure 9A:
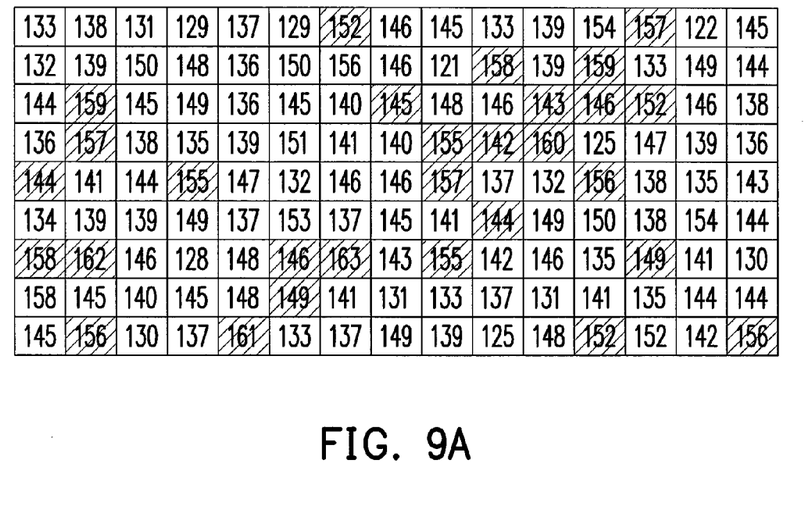
FIGS. 9A and 9B are two schematic diagrams illustrating a plurality of touch data and a plurality of touch values of the touch panel from FIG. 1 driven by the mutual capacitance positioning mode in accordance with yet another embodiment.
Figure 9B:
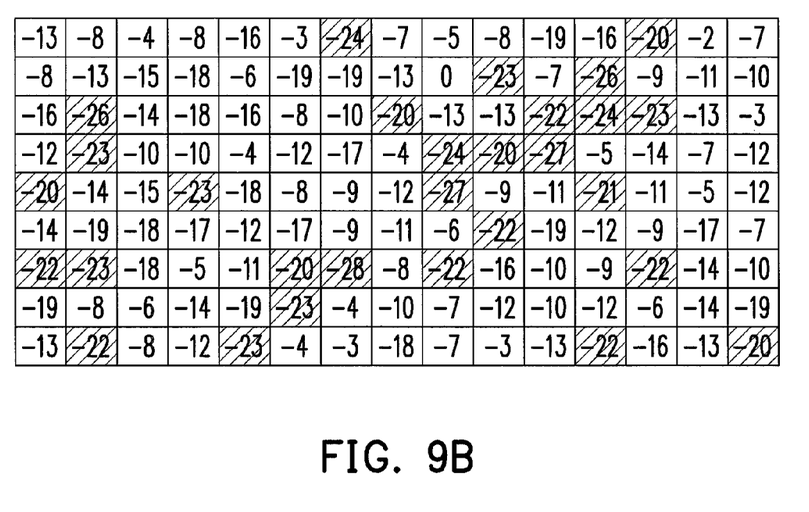

FIGS. 9A and 9B are two schematic diagrams illustrating a plurality of touch data and a plurality of touch values of the touch panel from FIG. 1 driven by the mutual capacitance positioning mode in accordance with yet another embodiment. With reference to FIG. 1, FIG. 5, FIG. 7A, FIG. 7B, FIG. 9A, and FIG. 9B, in the embodiment, the touch panel 110 is driven by the mutual capacitance positioning mode. Herein, x is 15 and y is 9 for instance, wherein the detecting time for the touch data DTT shown in FIG. 7A is earlier than the detecting time of the touch data DTT shown in FIG. 9A. Namely, the corresponding time of the touch values shown in FIG. 7B is earlier than the corresponding time of the touch values shown in FIG. 9B. Moreover, according to the embodiments illustrated in FIG. 5, FIG. 7A, FIG. 7B, FIG. 8A, and FIG. 8B, the present embodiment may set a re-calibration threshold for determining whether to perform the re-calibration of the data baseline values DB (as shown in FIG. 5), and the re-calibration of the data baseline values DB (as shown in FIG. 5) is generally performed during the non-touch screen period of the touch panel 110.

In the embodiment, the re-calibration threshold is set as 20. The touch data DTT of the touch areas 115 as shown in FIG. 9A are all higher than the corresponding touch data DTT of the touch areas 115 shown in FIG. 7A, and namely, the touch data DTT (as shown in FIGS. 7A and 9A) of the touch areas 115 are overall increasing with time. Moreover, a portion of the touch data DTT of the touch areas 115 are greater than or equal to the sum of the corresponding data baseline value DB (as shown in FIG. 5) and the re-calibration threshold (with reference to the slash grid shown in FIG. 9A). Namely, at least one of the touch data DTT of the touch areas 115 is greater than or equal to the sum of the corresponding data baseline value DB and the re-calibration threshold.

When all the touch data DTT (as shown in FIGS. 7A and 9A) of the touch areas 115 overall increase with time, and at least one of the touch data DTT of the touch areas 115 is greater than or equal to the sum of the corresponding data baseline value DB and the re-calibration threshold for a continuous period of n frames, the data baseline values DB (as shown in FIG. 5) of the touch areas 115 are re-calibrated by the touch detecting unit 120 in order to avoid the misjudgment of the touch point TP causing by the touch data DTT (as shown in FIGS. 7A and 9A), which are influenced by the ambient temperature changes to overall increase with time.

In an embodiment, the touch detecting unit 120 may determine whether to re-calibrate the data baseline values DB (as shown in FIG. 5) of the touch areas 115 according to the touch values (as shown in FIGS. 7B and 9B) of the touch areas 115. In other word, when the touch values of the touch areas 115 show in FIG. 9B are all less than the corresponding touch values of the same touch areas 115 shown in FIG. 7B, and at least one absolute values of the negative value portion of the touch values of the touch areas 115 shown in FIG. 9B is greater than or equal to the re-calibration threshold for a continuous period of n frames, the data baseline values DB (as shown in FIG. 5) of the touch areas 115 are re-calibrated by the touch detecting unit 120.

In an embodiment, the touch detecting unit 120 drives the touch panel 110 by alternating between the self capacitance positioning mode and the mutual capacitance positioning mode. When the touch detecting unit 120 may detect the touch point TP according to the touch values (e.g., the deviation between the data baseline value DB and the touch data DTT) as the touch panel 110 is driven by the self capacitance positioning mode, and touch detecting unit 120 may not detect the touch point TP according to the touch values as the touch panel 110 is driven by the mutual capacitance positioning mode, the corresponding data baseline values DB (as shown in DB_S of FIG. 2 and in FIG. 5) for at least one of the self capacitance positioning mode and mutual capacitance positioning mode has resulted in misjudgment of the touch point TP; therefore, the touch detecting unit 120 may re-calibrate the data baseline values DB of the touch panel 110. Otherwise, when the touch detecting unit 120 may detect the touch point TP as the touch panel 110 is driven by the mutual capacitance positioning mode and may not detect the touch point TP as the touch panel 110 is driven by the self capacitance positioning mode, the touch detecting unit 120 may also re-calibrate the data baseline values DB (as shown in DB_S of FIG. 2 and in FIG. 5) of the touch panel 110.

Figure 10:
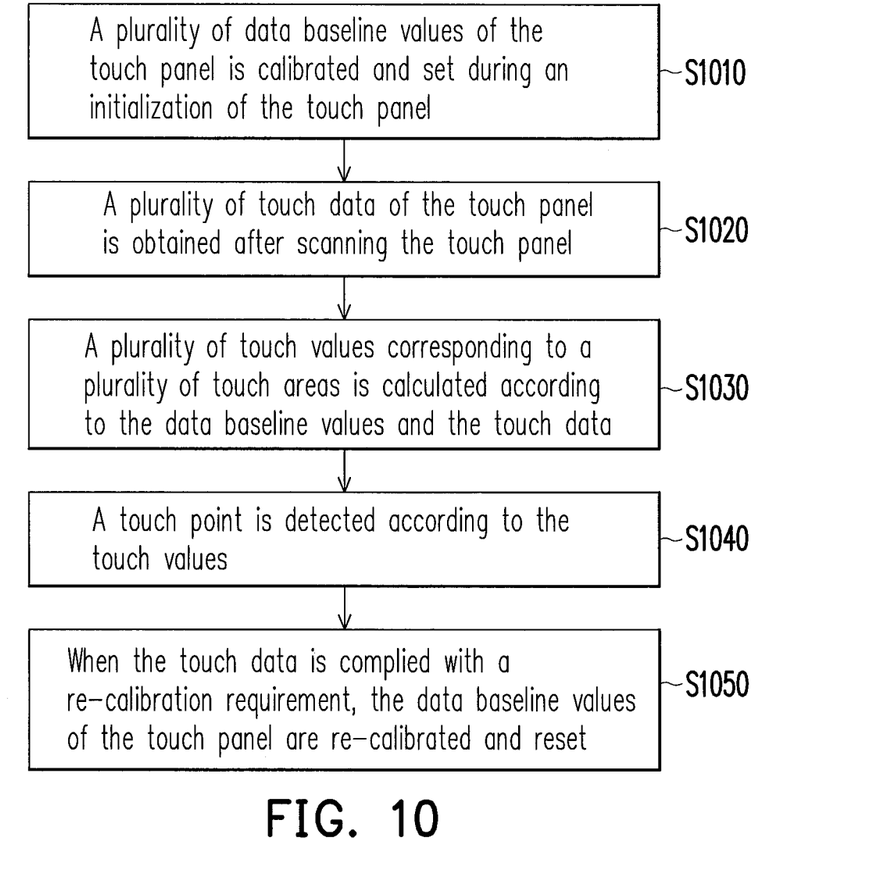
FIG. 10 is a flow chart diagram demonstrating an operating method for a touch device in accordance with an embodiment.

FIG. 10 is a flow chart diagram demonstrating an operating method for a touch device in accordance with an embodiment. With reference to FIG. 10, in the embodiment, the operating method for a touch device comprises the following steps. A plurality of data baseline values of the touch panel is calibrated and set during an initialization of the touch panel (step S1010). A plurality of touch data of the touch panel is obtained after scanning the touch panel (step S1020), and a plurality of touch values corresponding to a plurality of touch areas is calculated according to the data baseline values and the touch data (step S1030). Then, a touch point is detected according to the touch values (step S1040). When the touch data is complied with a re-calibration requirement, the data baseline values of the touch panel are re-calibrated and reset (step S1050). Wherein, the sequence of the aforementioned steps is, for example but not limited to, illustrating the embodiments of the invention, and the re-calibration requirement and the details of the steps may be referred to the embodiments illustrated in FIG. 1 to FIG. 5, FIG. 6A, FIG. 6B, FIG. 7A, FIG. 7B, FIG. 8A, FIG. 8B, FIG. 9A, FIG. 9B, herein further elaboration is omitted. Furthermore, only steps S1010, S1020, S1030, and S1040 are performed under the condition of not complying with the re-calibration requirement, and namely no re-calibration of the data baseline values is performed.

According to the above, the touch device and the operating method for the touch device re-calibrate the data baseline values of the touch panel when the touch data are complied with the re-calibration requirement, so as to avoid the misjudgment of the touch point causing by the incorrect data baseline values or the inappropriate data baseline values.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A touch device comprising:
  a touch panel having a plurality of column electrodes and a plurality of row electrodes, and the column electrodes are interlaced with the row electrodes to form a plurality of touch areas; and
  a touch detecting unit coupling to the touch panel, detecting a plurality of touch data of the touch panel to calibrate and set a plurality of data baseline values of the touch panel during an initialization, obtaining the touch data of the touch panel after scanning the touch panel, calculating a plurality of touch values according to the data baseline values and the touch data for detecting a touch point according to the touch values, and the data baseline values of the touch panel are re-calibrated and reset by the touch detecting unit after the touch data are complied with a re-calibration requirement, wherein the touch data is not utilized for detecting the touch point during the initialization while scanning is taking place during the initialization.

2. The touch device as recited in claim 1, wherein the touch panel is driven by a self capacitance positioning mode, and the data baseline values are a plurality of capacitances corresponding to the column electrodes and a plurality of row electrodes during the initialization.

3. The touch device as recited in claim 2, wherein the re-calibration requirement is that at least one of the touch data is less than or equal to a first deviation for a continuous period of n frames, wherein n is a positive value greater than or equal to 10, and the first deviation is a deviation between the corresponding data baseline value and a re-calibration threshold.

4. The touch device as recited in claim 2, wherein the re-calibration requirement is that the touch data increase or decrease with time, and at least one of the touch data is greater than or equal to a first sum or at least one of the touch data is less than or equal to a first deviation for a continuous period of n frames, wherein the first sum is a sum of the corresponding data baseline value and a re-calibration threshold, the first deviation is a deviation between the corresponding data baseline value and the re-calibration threshold, and n is a positive value greater than or equal to 10.

5. The touch device as recited in claim 1, wherein the touch panel is driven by a mutual capacitance positioning mode, and the data baseline values are a plurality of capacitances corresponding to the touch areas during the initialization.

6. The touch device as recited in claim 5, wherein the re-calibration requirement is that at least one of the touch data is greater than or equal to a first sum for a continuous period of n frames, wherein the first sum is a sum of the corresponding data baseline value and a re-calibration threshold, and n is a positive value greater than or equal to 10.

7. The touch device as recited in claim 5, wherein the re-calibration requirement is that the touch data increase or decrease with time, and at least one of the touch data is greater than or equal to a first sum or at least one of the touch data is less than or equal to a first deviation for a continuous period of n frames, wherein the first sum is a sum of the corresponding data baseline value and a re-calibration threshold, the first deviation is a deviation between the corresponding data baseline value and the re-calibration threshold, and n is a positive value greater than or equal to 10.

8. The touch device as recited in claim 1, wherein the re-calibration requirement is that the touch point is detected by the touch detecting unit when the touch panel is driven by one of a self capacitance positioning mode and a mutual capacitance positioning mode, but the touch point is not detected by the touch detecting unit, when the touch panel is driven by the another one of the self capacitance positioning mode and the mutual capacitance positioning mode.

9. An operating method for a touch device comprising:
  detecting a plurality of touch data of a touch panel to calibrate and set data baseline values of the touch panel during an initialization of the touch panel;
  obtaining the touch data of the touch panel after scanning the touch panel;
  calculating a plurality of touch values corresponding to the touch panel according to the data baseline values and the touch data;

detecting a touch point according to the touch values; and
re-calibrating and resetting the data baseline values of the touch panel when the touch data are complied with a re-calibration requirement,
wherein the touch data is not utilized for detecting the touch point during the initialization while scanning is taking place during the initialization.

10. The operating method for the touch device as recited in claim 9, wherein the touch panel is driven by a self capacitance positioning mode, and the data baseline values are a plurality of capacitances corresponding to a plurality of column electrodes and a plurality of row electrodes of the touch panel during the initialization.

11. The operating method for the touch device as recited in claim 10, wherein the re-calibration requirement is that at least one of the touch data is less than or equal to a first deviation for a continuous period of n frames, wherein n is a positive value greater than or equal to 10, and the first deviation is a deviation between the corresponding data baseline value and a re-calibration threshold.

12. The operating method for the touch device as recited in claim 10, wherein the re-calibration requirement is that the touch data increase or decrease with time, and at least one of the touch data is greater than or equal to a first sum or at least one of the touch data is less than or equal to a first deviation for a continuous period of n frames, wherein the first sum is a sum of the corresponding data baseline value and a re-calibration threshold, the first deviation is a deviation between the corresponding data baseline value and the re-calibration threshold, and n is a positive value greater than or equal to 10.

13. The operating method for the touch device as recited in claim 9, wherein the touch panel is driven by a mutual capacitance positioning mode, and the data baseline values are a plurality of capacitances corresponding to the touch areas of the touch panel during the initialization.

14. The operating method for the touch device as recited in claim 13, wherein the re-calibration requirement is that at least one of the touch data is greater than or equal to a first sum for a continuous period of n frames, wherein the first sum is a sum of the corresponding data baseline value and a re-calibration threshold, and n is a positive value greater than or equal to 10.

15. The operating method for the touch device as recited in claim 13, wherein the re-calibration requirement is that the touch data increase or decrease with time, and at least one of the touch data is greater than or equal to a first sum or at least one of the touch data is less than or equal to a first deviation for a continuous period of n frames, wherein the first sum is a sum of the corresponding data baseline value and a re-calibration threshold, the first deviation is a deviation between the corresponding data baseline value and the re-calibration threshold, and n is a positive value greater than or equal to 10.

16. The operating method for the touch device as recited in claim 9, wherein the re-calibration requirement is that the touch point is detected when the touch panel is driven by one of a self capacitance positioning mode and a mutual capacitance positioning mode, but the touch point is not detected when the touch panel is driven by the another one of the self capacitance positioning mode and the mutual capacitance positioning mode.

* * * * *